United States Patent

Dannenhauer et al.

[11] Patent Number: 5,876,809
[45] Date of Patent: Mar. 2, 1999

[54] MARKING FOR PAINTED OBJECTS AND METHOD OF APPLYING THE MARKING

[75] Inventors: Fritz Dannenhauer, Hasel; Karl Holdik, Ulm, both of Germany

[73] Assignee: Daimler-Benz Aktiengesellschaft, Stuttgart, Germany

[21] Appl. No.: 741,771

[22] Filed: Nov. 5, 1996

[30] Foreign Application Priority Data

Nov. 5, 1995 [DE] Germany .................. 195 41 029.7

[51] Int. Cl.$^6$ .................................................. C09K 19/00
[52] U.S. Cl. .................. 428/1; 250/473.1; 250/483.1; 428/323; 428/327; 428/913; 428/915; 428/916
[58] Field of Search ............................. 428/1, 323, 327, 428/913, 916, 915; 250/473.1, 483.1

[56] References Cited

U.S. PATENT DOCUMENTS

| | | | |
|---|---|---|---|
| 4,249,827 | 2/1981 | DiMatteo | 356/402 |
| 4,939,372 | 7/1990 | Schvoerer et al. | 250/484.1 |
| 5,191,574 | 3/1993 | Henshaw et al. | 369/100 |
| 5,297,076 | 3/1994 | Jefferson et al. | 365/119 |
| 5,475,518 | 12/1995 | Karaki | 359/154 |
| 5,515,394 | 5/1996 | Zhang | 372/72 |

FOREIGN PATENT DOCUMENTS

| | | |
|---|---|---|
| 0 717 388 | 6/1996 | European Pat. Off. . |
| 2 556 867 | 6/1985 | France . |
| 34 45 401 | 6/1986 | Germany . |
| 43 35 308 | 4/1995 | Germany . |
| WO 88 06330 | 8/1988 | WIPO . |

*Primary Examiner*—Nasser Ahmad
*Attorney, Agent, or Firm*—Evenson, McKeown, Edwards & Lenahan, P.L.L.C.

[57] ABSTRACT

This invention relates to a marking for painted objects, preferably motor vehicles, as well as to a method for producing the marking. For this purpose, a paint coat, preferably having several paint layers, is applied to the object and the spectral course of a partial spectrum of the electromagnetic spectrum of the paint coat arranged within an electromagnetic measuring range is changed in a targeted manner such that it has narrow-band extremes of at least 5% relative intensity change.

15 Claims, 1 Drawing Sheet

MARKING FOR PAINTED OBJECTS AND METHOD OF APPLYING THE MARKING

BACKGROUND AND SUMMARY OF THE INVENTION

This invention relates to a marking for painted objects, wherein characteristics of the paint coat are used for the marking, and to a method for marking painted objects in which a paint coat which preferably has several paint layers is applied to the object and wherein characteristics of the paint coat are used for marking the object. According to the present invention, such markings can be used for motor vehicles.

Published German Patent Application DE 43 35 308 A1 discloses a marking for motor vehicles which is intended to make motor vehicle thefts more difficult and to thereby discourage them. According to DE 43 35 308 A1, the marking is hard to remove and can easily be identified. The marking takes place by applying special information to constituents of a coding layer of the paint coat, wherein the coding corresponds to pigments. The pigments, which are smaller than the mm-range, do not interfere with the appearance of the paint coat. However, the application of the marking is very expensive, particularly for motor vehicles, because each marking can only be applied to one vehicle. Additionally, the marking of older vehicles is very expensive. Repainting, which might be necessary after a repair for example, is also expensive, especially as the marking is to remain and retain its significance in the freshly painted areas.

German Patent Document DE 34 45 401 A1 discloses another marking for motor vehicles where, in the case of a multi-layer paint coat, a coding layer provided with a marking is arranged under a paint layer. In the visible spectral range, the paint layer has a reflective characteristic. In a wave length range outside the visible spectrum, in which the viewing of the marking of the coding layer is to take place, the paint layer is transparent. However, a disadvantage exists in that during the painting, the application of an additional layer, specifically a coding layer, and its subsequent coding is necessary. In addition, retouching the paint in the case of an accident is also expensive.

It is an object of the present invention to provide a marking that can be simply applied during the manufacture of objects to be marked. Furthermore, it is an object of the present invention to provide a method for applying a marking which is useful to recode older objects as well as to recode repaired objects.

The marking according to the present invention is characterized in that, in a measuring range of electromagnetic waves which is arranged within the electromagnetic spectrum of the paint coat, the paint coat has a largely constant spectral electromagnetic partial spectrum which, at certain frequencies, has narrow-band extremes of at least 5% relative intensity change. The method according to the present invention is characterized in that the spectral course of the partial spectrum of the electromagnetic spectrum of the paint coat arranged within an electromagnetic measuring range, is changed in a targeted manner such that it has narrow-band extremes of at least 5% relative intensity change.

As a result of the targeted introduction of narrow-bands and abrupt changes at defined frequencies within a measuring range of the electromagnetic spectrum of the paint coat, a specific code used for marking can be assigned to any painted object, particularly any motor vehicle, and the coding can take place in a simple manner. A further advantage is that older objects can also be marked without any significant change of the color impression of the paint coat.

Other objects, advantages and novel features of the present invention will become apparent from the following detailed description of the invention when considered in conjunction with the accompanying drawings.

DETAILED DESCRIPTION OF THE DRAWINGS

Figure 1:
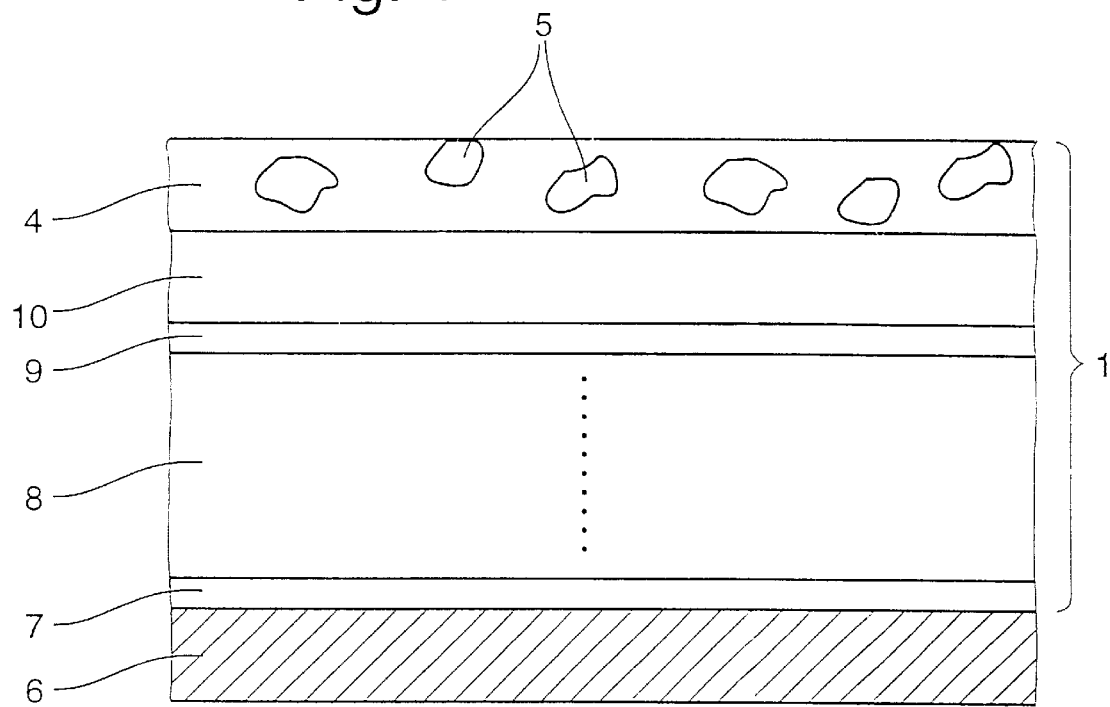
FIG. 1 is a sectional view of the paint coat of a painted object.

FIG. 1 is a sectional view of a paint coat 1 of an object 6. In a preferred embodiment, the object is a sheet metal body of a motor vehicle. The paint coat 1 has a multi-layer structure of flat layers arranged one on top of the other. The layer structure of the paint coat 1 over the object 6 comprises a phosphatizing layer 7, a priming layer 8, a filling layer 9, a colored paint layer 10 and an exterior paint layer 4 in which, depending on the technical requirements, the phosphatizing layer 7 and the filling layer 9 can be replaced or left out. Furthermore, it may be useful to cover the exterior paint layer 4 with another transparent coating so that pigments 5 disposed in paint layer 4 cannot project from its surface.

Figure 2:
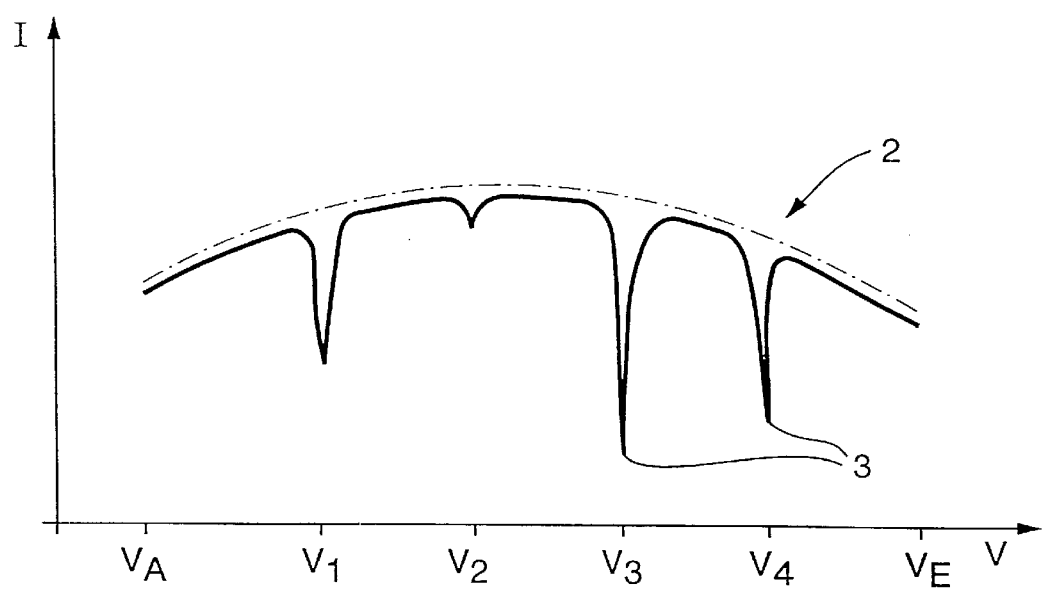
FIG. 2 is a spectral segment falling within a predetermined measurement range of the electromagnetic spectrum of a paint coat.

In order to apply the marking to the object 6, the electromagnetic spectrum of the paint coat 1 is manipulated such that, as illustrated in FIG. 2, within a measuring range which is situated between the limit frequencies $V_A$ and $V_E$, it has a substantially constant spectral electromagnetic spectral segment 2 which, at certain characterizing frequencies $V_1$, $V_2$, $V_3$ and $V_4$, exhibits extreme, narrow-band relative intensity changes 3 of at least 5%.

According to the present invention, the marking is preferably applied after drying, in that the paint coat 1 is removed by laser in at least some areas and the characterizing frequencies $V_1$, $V_2$, $V_3$ and $V_4$ are eliminated from the spectral segment 2 of the electromagnetic spectrum of the paint coat.

In the present case according to FIG. 1, the exterior paint layer 4 composed of a transparent coating contains pigments 5 which desirably are transparent in the visual spectral range. In this case, the pigments 5 are expediently provided with a marking forming a code and are added to the coating material of the exterior paint layer 4 before its application.

The marking may suitably be introduced in that, during production of the pigment or after the application of the pigmented coating, particularly after the drying of the paint layer 4 of the paint, the pigments 5 are marked by laser and the characterizing frequencies $V_1$, $V_2$, $V_3$ and $V_4$ are eliminated from the spectral segment 2.

Hole burning, as disclosed for example in U.S. Pat. Nos. 5,191,574, 5,297,076, 4,475,518, and 5,515,394, the entire disclosures of which are herein incorporated by reference, may be used to eliminate the particular frequencies from the spectrum. Advantageously, the specific frequencies $V_1$, $V_2$, $V_3$ and $V_4$ are selected outside the visible spectral range and particularly in a spectral range in which the remaining constituents of the paint 1 have low optical activity. As a result, these remaining constituents of the paint coat 1 exert at most a slightly disturbing effect on the spectral segment 2 of the marking.

The pigments 5 are preferably polymers made of a liquid crystalline substance with a chiral phase because such polymers make it possible for the paint to exhibit, in addition, a color flop (i.e. color change) effect.

As illustrated in FIG. 2, the spectral segment 2 is arranged between the frequency limits $V_A$ (starting frequency) and $V_E$ (ending frequency). The various intensity breaks of the extreme intensity changes 3 occur at the characterizing frequencies $V_1$, $V_2$, $V_3$ and $V_4$ which, as a group, form a characteristic pattern which constitutes the marking of the object.

Since the extreme intensity changes are advantageously generated by radiation with a semiconductor laser, the individual extreme intensity changes 3 preferably exhibit a half-intensity width less than 10 Angstroms and particularly less than 1 Angstrom.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A marking of a paint coat of a painted object, wherein in a measuring range of electromagnetic waves having a constant spectrum within an electromagnetic spectrum of the paint coat, the marking comprises a plurality of narrow-band intensity breaks of at least 5% relative intensity change at certain frequencies outside the visible frequency range, wherein said intensity breaks form an identification of said painted object.

2. The marking according to claim 1, wherein the paint coat has several paint layers, wherein one of the paint layers has pigment particles and the pigment particles are provided with the marking.

3. The marking according to claim 1, where the intensity breaks have a half intensity width less than 10 Angstroms.

4. The marking according to claim 1, where the intensity breaks have a half intensity width less than 1 Angstroms.

5. The marking according to claim 1, wherein the painted object is a motor vehicle.

6. The marking according to claim 2, wherein one of the paint layers is a transparent exterior protective layer comprising pigment particles, wherein the pigment particles are transparent in the visible spectral range.

7. The marking according to claim 2, wherein the pigment particles are polymers.

8. The marking according to claim 2, wherein the pigment particles are liquid crystalline substances with a chiral phase.

9. A method for marking an object with a paint coat, comprising the steps of:

applying a paint coat to the object;

changing a measuring range of electromagnetic waves in an electromagnetic spectrum of the paint coat, such that a plurality of narrow-band intensity breaks of at least 5% relative intensity change at specific frequencies outside the visible frequency range form an identification of said object.

10. The method according to claim 9, wherein the paint coat has several paint layers.

11. The method according to claim 10, wherein pigment particles which have the marking are added to at least one of the paint layers of the paint coat.

12. The method according to claim 9, wherein the intensity breaks, which are each assigned to a specific frequency, are introduced in the measuring range by laser radiation.

13. The method according to claim 9, wherein the intensity breaks are generated by applying laser light of the corresponding frequency to the paint coat in a dried state.

14. The method according to claim 9, wherein the intensity breaks are generated by radiation with a semiconductor laser.

15. The method according to claim 9, wherein the painted object is a motor vehicle.

\* \* \* \* \*